(12) United States Patent
Ko et al.

(10) Patent No.: US 8,254,727 B2
(45) Date of Patent: Aug. 28, 2012

(54) METHOD AND APPARATUS FOR PROVIDING PICTURE FILE

(75) Inventors: Chang-seog Ko, Hwaseong-si (KR); Young-sun Kim, Suwon-si (KR); Yoo-jin Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 799 days.

(21) Appl. No.: 12/101,310

(22) Filed: Apr. 11, 2008

(65) Prior Publication Data

US 2009/0010491 A1    Jan. 8, 2009

(30) Foreign Application Priority Data

Jul. 2, 2007    (KR) .................. 10-2007-0066188

(51) Int. Cl.
*G06K 9/00* (2006.01)
*G06K 9/60* (2006.01)

(52) U.S. Cl. .................. 382/305; 382/103; 382/106

(58) Field of Classification Search .................. 382/305, 382/106, 103
See application file for complete search history.

(56) References Cited

U.S. PATENT DOCUMENTS

| | | | | |
|---|---|---|---|---|
| 5,442,557 A * | 8/1995 | Kaneko | .................. | 701/213 |
| 6,657,661 B1 * | 12/2003 | Cazier | .................. | 348/231.2 |
| 6,813,395 B1 * | 11/2004 | Kinjo | .................. | 382/305 |
| 7,149,503 B2 * | 12/2006 | Aarnio et al. | .................. | 455/414.1 |
| 7,239,759 B2 * | 7/2007 | Nam et al. | .................. | 382/305 |
| 7,421,154 B2 * | 9/2008 | Kinjo | .................. | 382/305 |
| 7,492,966 B2 * | 2/2009 | Watanabe | .................. | 382/291 |
| 7,778,440 B2 * | 8/2010 | Malone | .................. | 382/100 |
| 7,844,611 B2 * | 11/2010 | Miyajima et al. | .................. | 707/749 |
| 7,860,320 B2 * | 12/2010 | Luo et al. | .................. | 382/227 |
| 8,073,265 B2 * | 12/2011 | Liao et al. | .................. | 382/225 |
| 2002/0154213 A1 | 10/2002 | Sibyama et al. | | |
| 2006/0025071 A1 * | 2/2006 | Yamazaki et al. | .................. | 455/3.06 |
| 2006/0132602 A1 * | 6/2006 | Muto et al. | .................. | 348/148 |
| 2007/0008515 A1 * | 1/2007 | Otani et al. | .................. | 356/5.02 |
| 2007/0103461 A1 * | 5/2007 | Suzuno et al. | .................. | 345/419 |

FOREIGN PATENT DOCUMENTS

CN    1366765 A    8/2002

OTHER PUBLICATIONS

Communication dated Nov. 24, 2011, issued by the State Intellectual Property Office of the People's Republic of China in corresponding Chinese Patent Application No. 200810091364.X.

* cited by examiner

*Primary Examiner* — Bhavesh Mehta
*Assistant Examiner* — Utpal Shah
(74) *Attorney, Agent, or Firm* — Sughrue Mion, PLLC (57) ABSTRACT

A method and an apparatus for providing a picture file are provided. The picture file providing apparatus includes a controller which searches for one or more picture files based on a location of a subject, and a screen display unit which forms a display screen to display the one or more picture files that were found, in order to provide a user with the direction information included in each picture file. Each picture file includes picture data, information on a location in which the picture data was created, and information on a direction of a captured image of a subject included in the picture data.

16 Claims, 8 Drawing Sheets

METHOD AND APPARATUS FOR PROVIDING PICTURE FILE

CROSS-REFERENCE TO RELATED PATENT APPLICATION

This application claims priority from Korean Patent Application No. 10-2007-0066188, filed on Jul. 2, 2007 in the Korean Intellectual Property Office, the disclosure of which is incorporated herein in its entirety by reference.

BACKGROUND OF THE INVENTION

1. Field of the Invention

Apparatuses and methods consistent with the present invention relate to providing a picture file, and more particularly, to providing a picture file, which makes it possible to easily identify the location and direction of a subject captured in a picture.

2. Description of the Related Art

Technologies for efficiently managing and sharing content generated by electronic devices, such as digital cameras, have been developed owing to an increase in the use of electronic devices. When a user takes a picture of a subject, technologies for separately managing information on a location of the subject and searching for the picture based on the location information have been suggested. However, since related art technology is supposed to search for pictures taken at a specific location, it is useful to simply see pictures taken at the specific location. However, in order to search for pictures that have captured a specific subject, it is necessary to identify all pictures that have captured the specific subject and a specific location around the specific subject.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and apparatus for providing a picture file, by easily searching for pictures that capture a subject at a specific location, or pictures that are taken at a location around or close to the subject.

According to an aspect of the present invention, there is provided a method of providing a picture file. The method includes searching for one or more picture files based on a location of a subject, and displaying the one or more picture files that were found on a screen in order to provide a user with the direction information included in each picture file. Each picture file includes picture data, information on a location in which the picture data was created, and information on a direction of a captured image of a subject included in the picture data.

According to another aspect of the present invention, there is provided an apparatus for proving a picture file. The apparatus includes a controller which searches for one or more picture files based on a location of a subject, and a screen display unit which forms a display screen to display the one or more picture files that were found in order to provide a user with the direction information included in each picture file. Each picture file includes picture data, information on a location in which the picture data was created, and information on a direction of a captured image of a subject included in the picture data.

According to another aspect of the present invention, there is provided a computer readable recording medium which stores a computer readable program for executing a picture file providing method. The method includes searching for one or more picture files based on a location of a subject, and displaying the one or more picture files that were found based on the location of the subject on a screen in order to provide a user with the direction information included in each picture file. Each picture file includes picture data, information on a location in which the picture data was created, and information on a direction of a captured image of a subject included in the picture data.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention will be described in detail by explaining exemplary embodiments of the invention with reference to the attached drawings.

Figure 1:
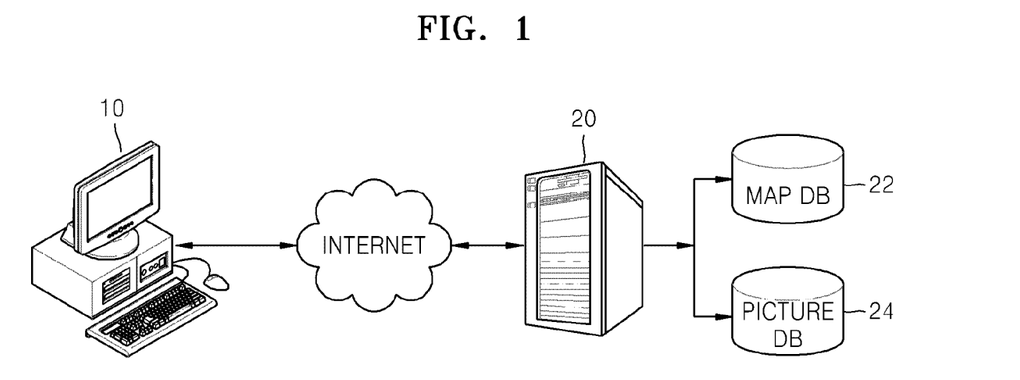
FIG. 1 illustrates a picture file providing system according to an exemplary embodiment of the present invention.

FIG. 1 illustrates a picture file providing system according to an exemplary embodiment of the present invention. Referring to FIG. 1, the picture file providing system includes a user terminal device 10 used for communication via the Internet and a Web server 20.

The user terminal device 10 requests the Web server 20 to provide map data indicating a predetermined location. The Web server 20 searches a map database 22 and provides the user terminal device 10 with the map data via the Internet. The map data containing geographical information is not limited to any particular format or type.

If a user selects the predetermined location from the map data, the user terminal device 10 requests one or more picture files corresponding to the selected location. The Web server 20 searches a picture database 24 and provides the user terminal device 10 with the picture files. The Web server 20 provides the user terminal device 10 with one or more picture files containing information on a location within a predetermined region, including the predetermined location selected by the user.

In the present exemplary embodiment, the picture file includes picture data that is a captured image of a subject, information on a location in which the picture data is created, and information on a direction of the subject included in the picture data. For example, the location information can be obtained using a global positioning system (GPS), and the direction information can be azimuth information. However, data indicating the location and direction information is not limited to any particular format.

The picture files can be created by a camera which includes means for measuring or receiving the location and direction information. For example, the camera that creates the picture files may be capable of receiving the location information measured by using the GPS, and obtaining the direction information by using its digital compass function. The location and direction information can be stored in an exchangeable image file format (EXIF) as metadata of the picture files.

The user terminal device 10 adds one or more picture files that were found based on a predetermined location to the map data, and displays the picture files in order to display location information included in each picture file.

Figure 2:
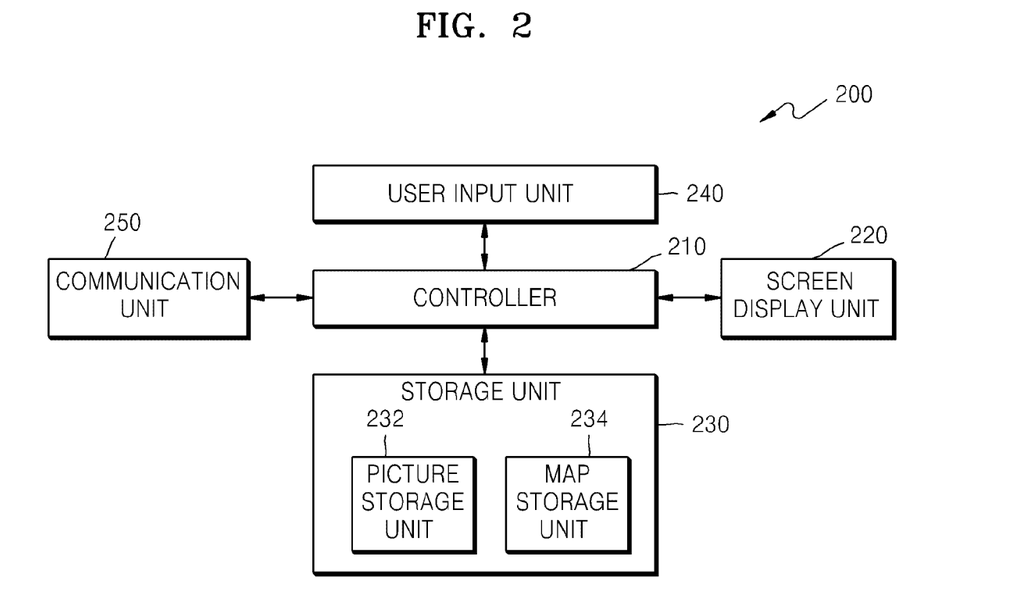
FIG. 2 is a block diagram of a picture file providing apparatus according to an exemplary embodiment of the present invention.

FIG. 2 is a block diagram of a picture file providing apparatus 200 according to an exemplary embodiment of the present invention. Referring to FIG. 2, the picture file providing apparatus 200 comprises a controller 210, a screen display unit 220, a storage unit 230, a user input unit 240, and a communication unit 250. The picture file providing apparatus 200 can be embodied as various devices, such as a personal computer (PC), a personal digital assistant (PDA), a digital camera, or a cellular phone.

The controller 210 controls each component in the picture file providing apparatus 200 that communicates data in order to generally control the picture file providing apparatus 200. The controller 210 searches for one or more picture files containing picture data, information on a location in which the picture data is created, and information on a direction of the subject included in the picture data based on a predetermined location.

The controller 210 searches for the picture files that are stored in a picture storage unit 232 included in the storage unit 230, or that can be downloaded from a server (not shown) that provides a picture file over a wired or wireless network through the communication unit 250.

The screen display unit 220 displays the one or more picture files that were found based on the predetermined location in order to indicate the direction information included in each picture file.

In the same manner as searching for the picture files, map data included in the screen constructed by the screen display unit 220 is stored in a map storage unit 234 included in the storage unit 230, or can be downloaded from a server (not shown) that provides map data over a wired or wireless network through the communication unit 250.

According to another exemplary embodiment, in a first search mode, the controller 210 can search for one or more picture files containing information on a direction faced by a predetermined subject based on information on a location within a predetermined region around the predetermined subject. In more detail, in the first search mode, the controller 210 searches for the picture files that were captured at a location of the predetermined subject or at the location around the predetermined subject. The predetermined region around the predetermined subject can vary based on the scope of a search region.

Alternatively, in a second search mode, the controller 210 can search for one or more picture files containing information on a direction identical to one of all directions around a predetermined location based on a location that is the same as or is close to a location of the predetermined subject. In more detail, in the second search mode, the controller 210 searches for the picture files that were captured at various directions from the location of the predetermined subject.

The user input unit 240 receives a user input signal and sends it to the controller 210. The controller 210 controls the picture file providing apparatus 200 based on the user input signal.

The controller 210 can select an operation mode for searching for one or more picture files, i.e., the first search mode or the second search mode, based on the user input signal. For example, the screen display unit 220 can form a display screen by preparing user interface means, such as a toggle, on a screen so that the user can select the search mode.

Meanwhile, the controller 210 searches for picture files using the following method and provides the picture files.

The controller 210 divides a predetermined region including a predetermined location into two or more azimuth regions with regard to the predetermined location. The controller 210 classifies one or more picture files based on the azimuth regions. In more detail the controller 210 classifies the picture files based on each azimuth region to which the picture files belong. The screen display unit 220 displays one of the picture files that are classified based on each azimuth region.

At this time, if the user input unit 240 receives the user input signal to select one of the displayed picture files, the controller 210 controls the screen display unit 220 to display a picture file list of the one or more picture files based on each azimuth region to which the displayed picture files belong. When the picture file list is displayed on the screen, if the user input signal to select one of the displayed picture files from the list is input, the controller 210 controls the screen display unit 220 to enlarge the selected picture file.

Alternatively, the controller 210 controls the screen display unit 220 to display a mark indicating a location of each picture file, such as a location indicator, or to rotate each picture file based on location information on the screen.

The picture file providing apparatus 200 can further comprise a display unit (not shown) for outputting the screen display.

In the present exemplary embodiment, the picture file providing apparatus 200 is a user terminal device. However, the picture file providing apparatus 200 can be a Web server that receives a user input signal through the user terminal device and provides a picture file providing service, and can be applied to a variety of devices for providing picture files found based on a predetermined location along with location information.

Figure 3:
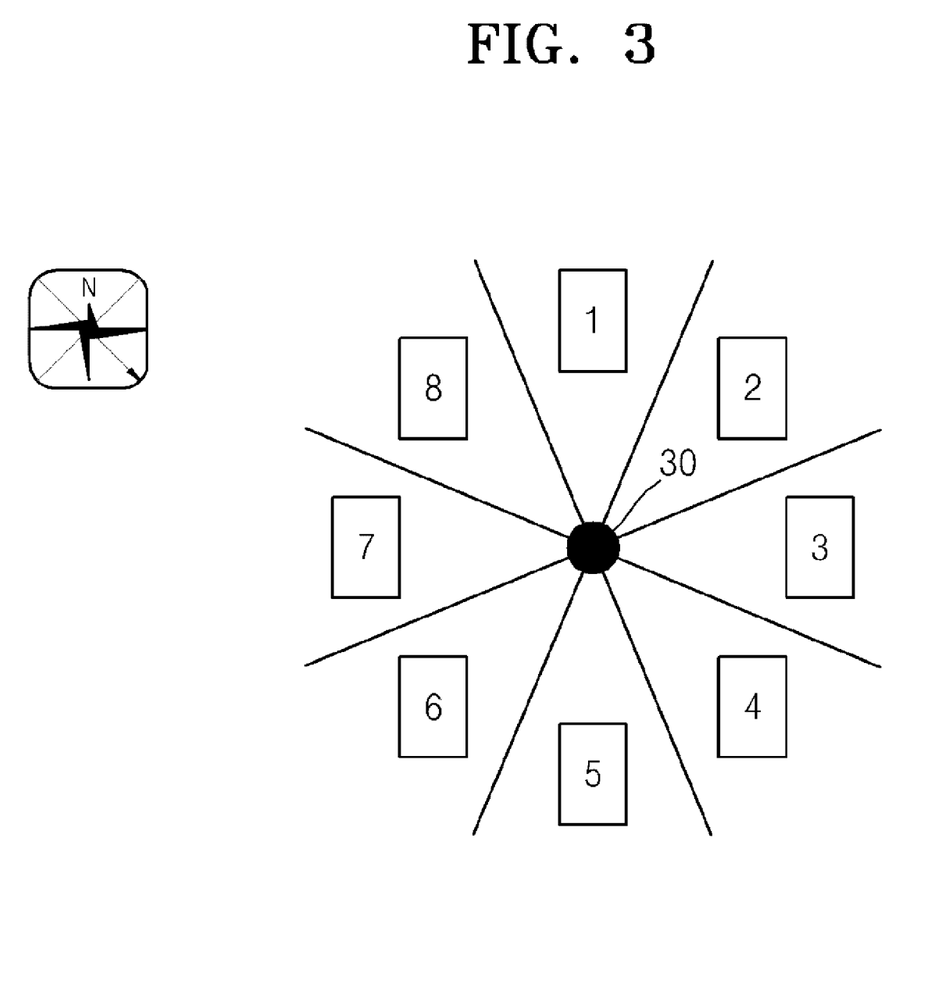
FIG. 3 is a diagram for explaining a picture search process based on a specific location according to an exemplary embodiment of the present invention.

FIG. 3 is a diagram for explaining a picture search process based on a specific location according to an exemplary embodiment of the present invention. Referring to FIG. 3, the first search mode will now be described. In more detail, the controller 210 searches for one or more picture files containing information on a direction which a predetermined subject faces, based on information on a location within a predetermined region around the predetermined subject. If a user selects a location on a map displayed on the screen of the picture file providing apparatus 200, such as a location point 30, the controller 210 searches for pictures that are captured at a predetermined region including the location point 30.

The controller 210 divides the predetermined region including the location point 30 into eight azimuth regions, searches for one or more picture files based on a location of a predetermined subject based on the eight azimuth regions, and classifies the picture files based on direction information included in each picture file. The screen display unit 220 displays one of the picture files that are classified based on each azimuth region.

Reference numbers 1 through 8, each having a rectangular shape, are disposed in eight azimuths as shown in FIG. 3. The picture shown is the picture that was most recently acquired among the classified picture files, or the picture file including information on a direction close to the center azimuth angle of each of the eight azimuth regions. For example, when a subject is at the location point 30, the shown picture file has location information indicating that the location of the reference number 1 is at a similar longitude to and at a higher latitude than that of the location point 30, and has direction information indicating that location of the reference number 1 is in a southerly direction. The picture file which has location information indicating that the location of the reference number 3 is at a similar latitude to and at a longitude to the right of the location point 30 is shown at the location of the reference number 3.

The second search mode will now be described. The controller 210 searches for one or more picture files containing information on a direction identical to one of all directions around a predetermined location, based on a location that is the same as or is close to a location of the predetermined subject in the second search mode.

If the user selects a location on the map displayed on the screen of the picture file providing apparatus 200, such as the location point 30, the controller 210 searches for pictures that are captured at a predetermined region including the location point 30. If the subject is located in a relatively large region, since the region can have a plurality of pieces of location information, the controller 210 can search for a plurality of picture files having a value indicating a location within the predetermined region including the location point 30.

The controller 210 divides the predetermined region including the location point 30 into eight or more azimuth regions, searches for one or more picture files based on the eight or more azimuth regions, and classifies the one or more picture files based on direction information included in each picture file.

The screen display unit 220 displays one of the one or more picture files that are classified based on each azimuth region. The displayed picture files are the most recent ones from among the classified picture files, or can be established to include information on a direction close to the center azimuth angle of each of the eight or more azimuth regions.

FIGS. 4A through 4D are screen images provided by the picture file providing apparatus 100, and illustrate a method of searching for pictures based on a predetermined location according to an exemplary embodiment of the present invention.

Figure 4A:
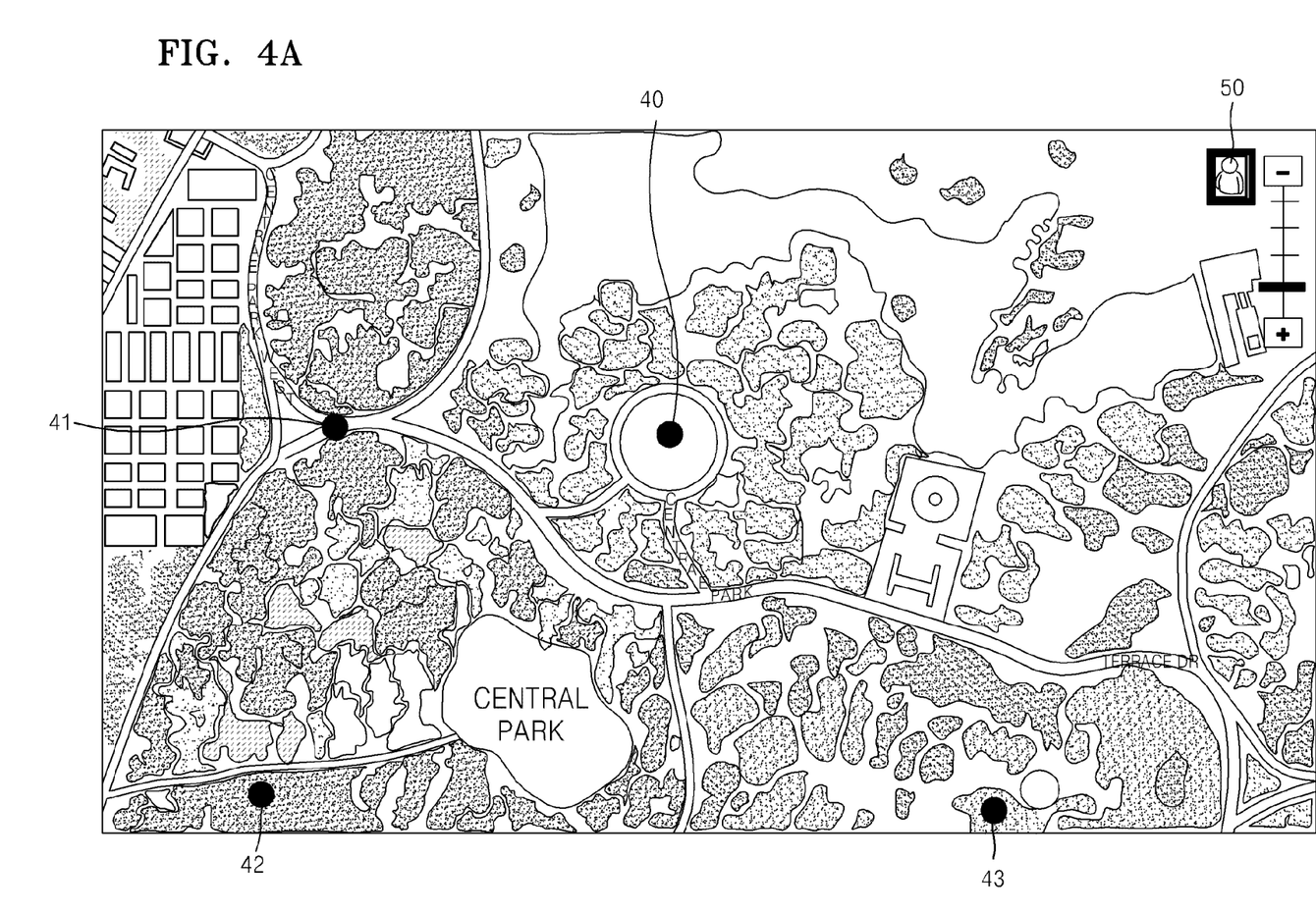
FIGS. 4A through 4D are screen images provided by a picture file providing apparatus, and illustrate a method of searching for pictures based on a predetermined location according to an exemplary embodiment of the present invention.

Referring to FIG. 4A, map data is displayed on a screen of the picture file providing apparatus 200. The map data includes location points 40 through 43 that can be found to be picture files. The picture file providing apparatus 200 analyzes information on locations of picture files, indicates the location points 40 through 43 that share the information on locations of picture files, and provides a user with the location points 40 through 43.

Figure 4B:
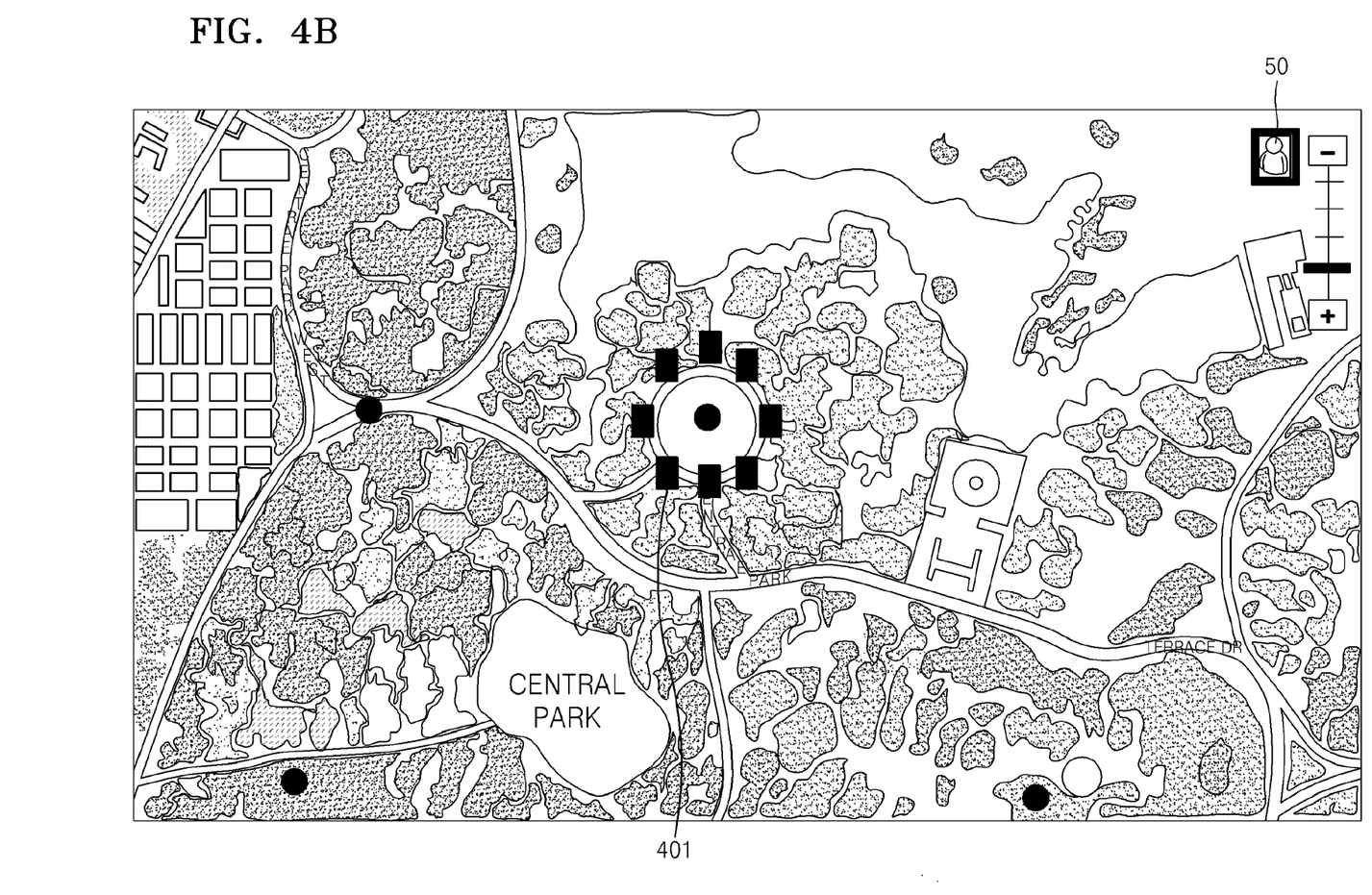

If a user selects the location point 40, eight picture files 401 that are found based on the location point 40 are displayed in eight azimuths, as shown in FIG. 4B. The eight picture files 401 can be captured at a location facing the location point 40 based on an operation mode, at the location point 40, or in various directions around the location point 40. A search mode can be changed by selecting a toggle 50.

Figure 4C:
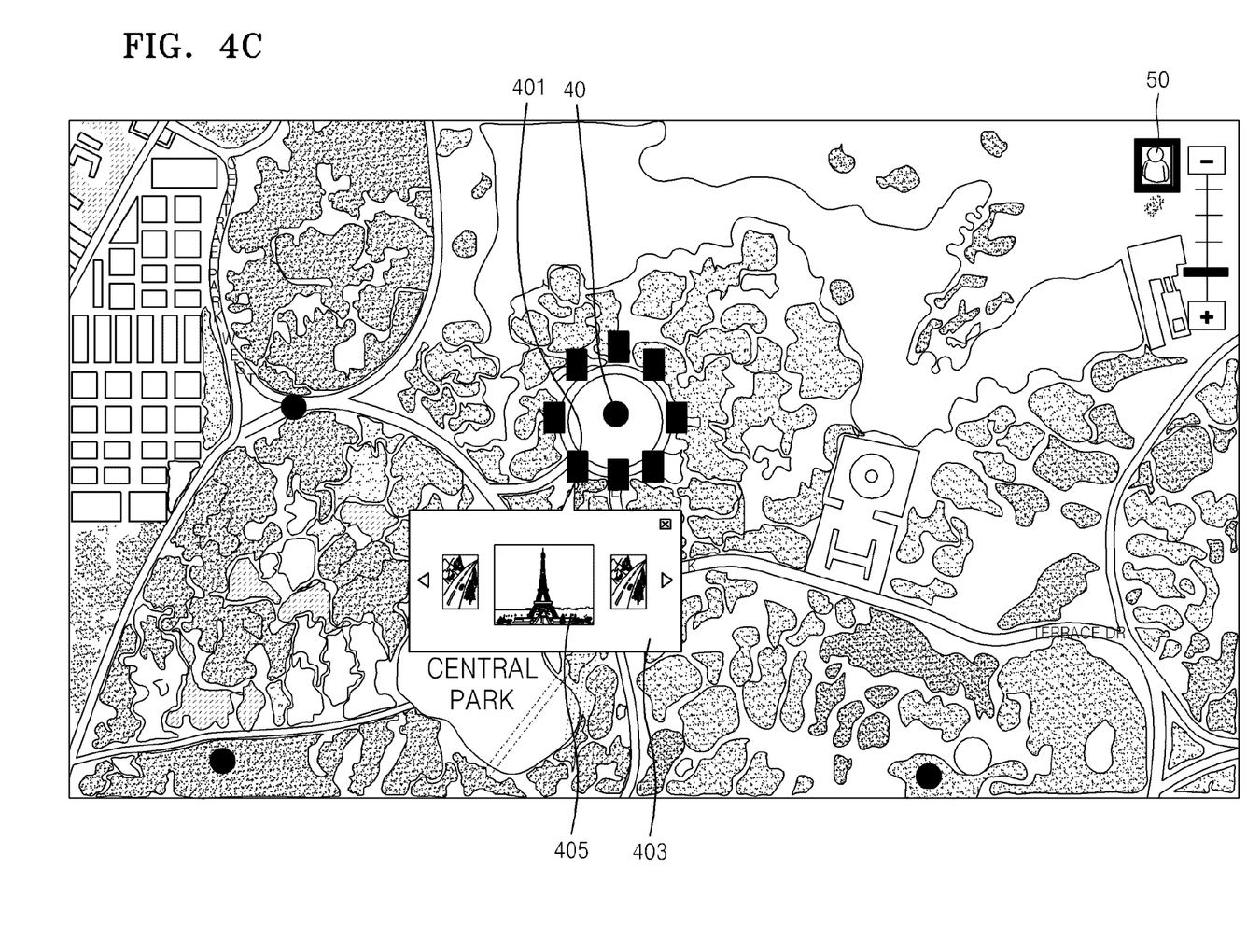
Figure 4D:
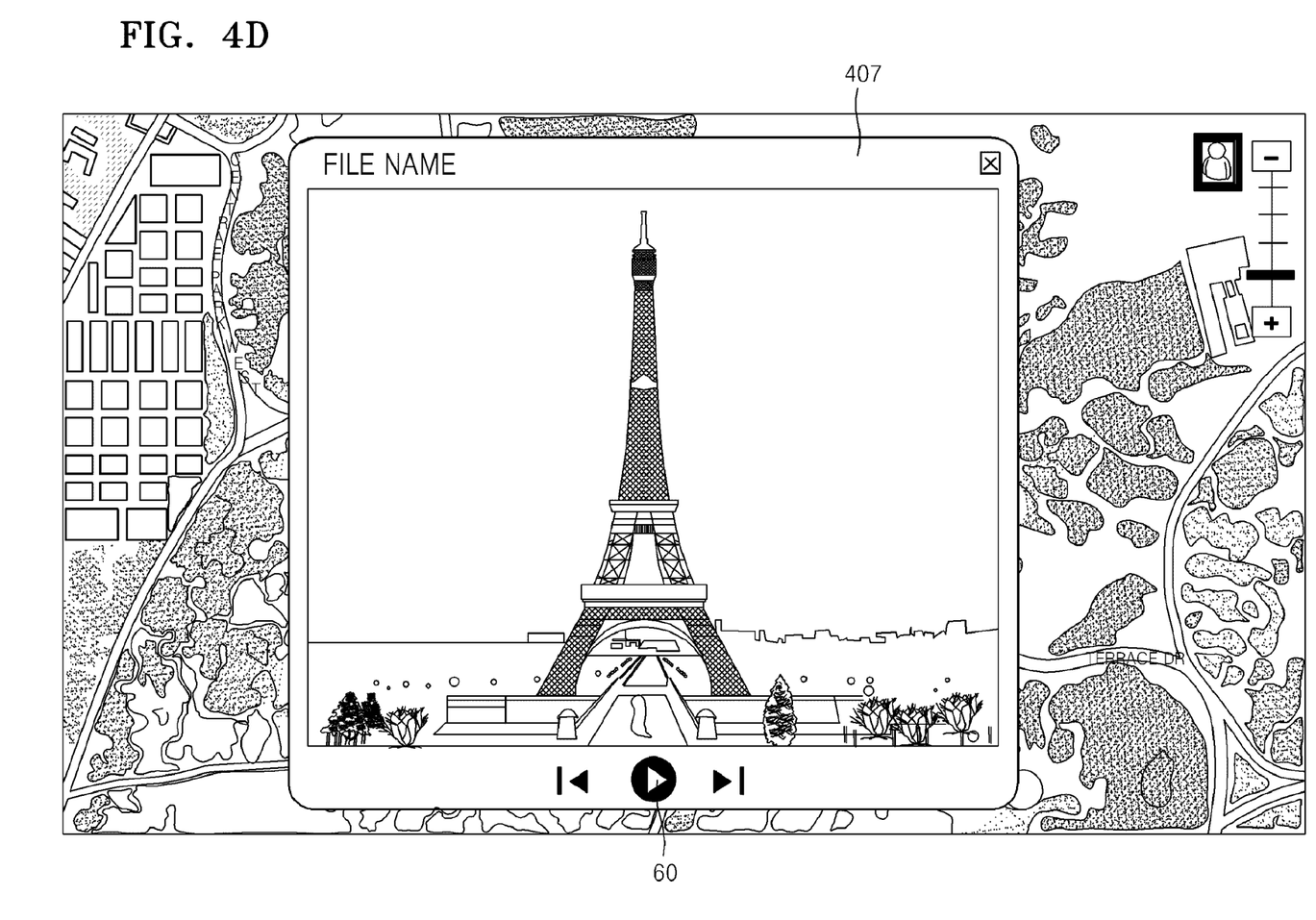

If the user selects a picture file 401, a picture file list 403 that belongs to the same azimuth region as the picture file 401 can be provided in the form of a thumbnail, as shown in FIG. 4C. If the user selects a picture file 405 from the picture file list 403, a window 407 that enlarges the picture file 405 is displayed, as shown in FIG. 4D. An icon 60 is provided on the window 407. If the user selects the icon 60, the picture file providing apparatus 200 displays a picture previous to or next to the picture file 405 on the screen, or displays picture files that are selected from the picture file list 403 by performing a slideshow.

Figure 5A:
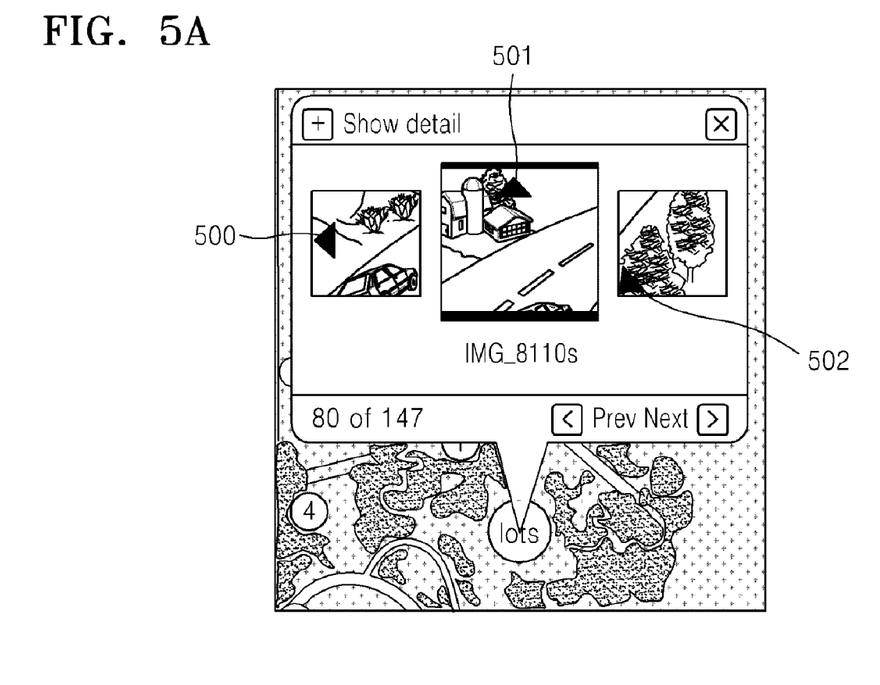
FIGS. 5A and 5B are screen images provided by a picture file providing apparatus according to another exemplary embodiment of the present invention.
Figure 5B:
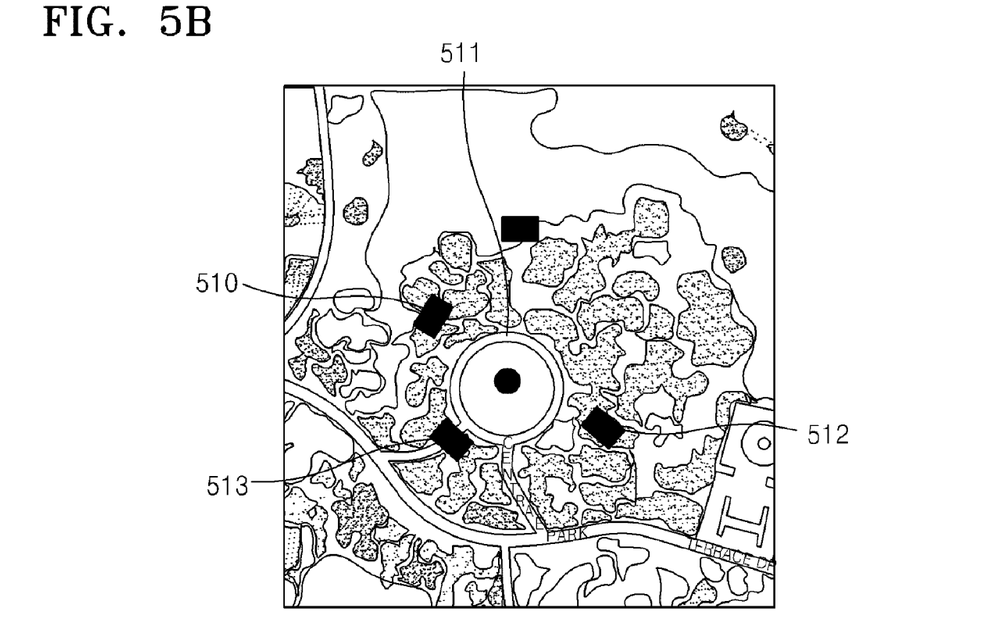

FIGS. 5A and 5B are screen images provided by the picture file providing apparatus 200 according to another exemplary embodiment of the present invention.

As described above, in order to provide a user with direction information on picture files, two or more azimuth regions are divided based on a specific location, and picture files are indicated in the two or more azimuth regions. In addition, referring to FIG. 5A, picture files can be displayed with marks 500 through 502 which indicate direction information on each picture file. Alternatively, referring to FIG. 5B, picture files 510 through 513 can be displayed after being rotated based on direction information on each picture file.

Figure 6:
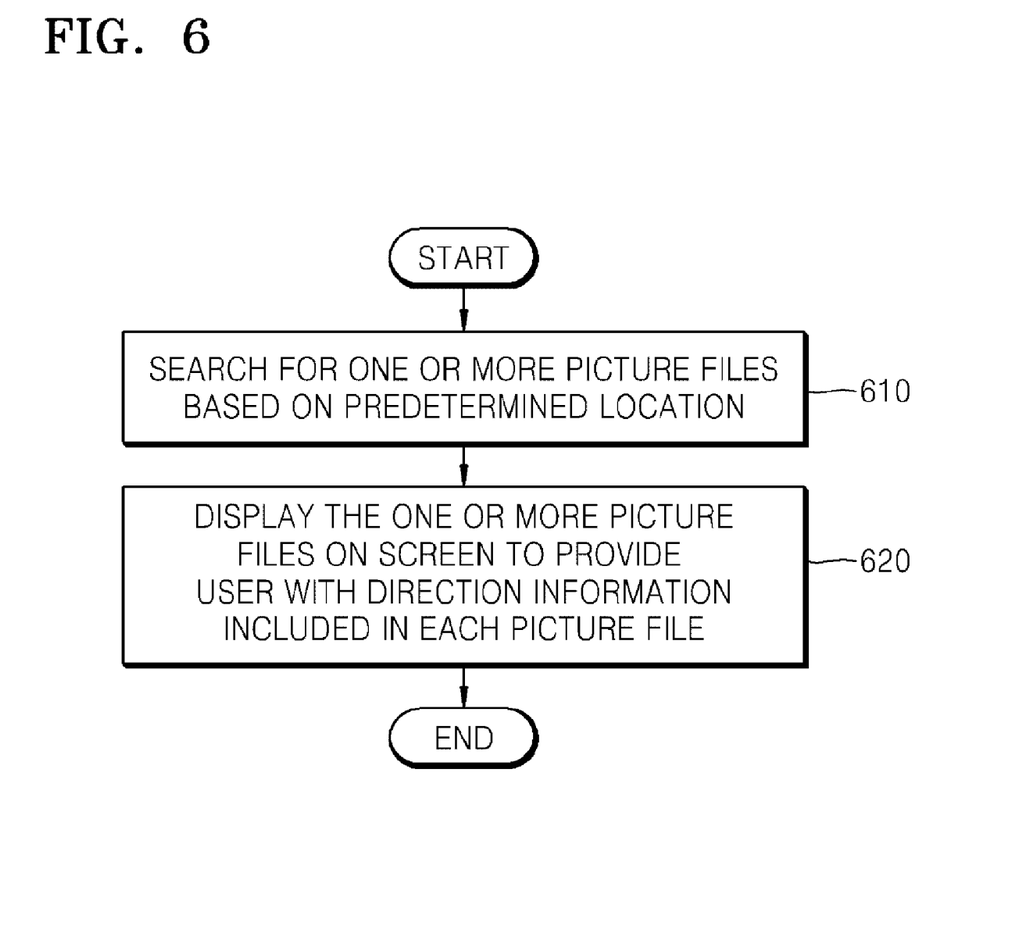
FIG. 6 is a flowchart illustrating a picture file providing method according to an exemplary embodiment of the present invention.

FIG. 6 is a flowchart illustrating a picture file providing method according to an exemplary embodiment of the present invention. Referring to FIG. 6, in operation 610, one or more picture files, which include picture data, information on a location in which the picture data is created, and information on a direction of a captured image of a subject included in the picture data, are searched for based on a predetermined location.

It is possible to carry out operation 610 in a first search mode where the one or more picture files that are captured at a location facing the predetermined subject within a predetermined region around a predetermined subject are searched for. Alternatively, it is possible to carry out operation 610 in a second search mode where the one or more picture files that are captured in various directions around a location of the predetermined subject are searched for.

In operation 620, the one or more picture files that were found based on the predetermined location are displayed on a screen, in order to provide a user with the direction information included in each picture file. In this regard, the picture file providing apparatus 200 divides the one or more picture files into two or more azimuth regions based on the predetermined location, classifies the one or more picture files based on the two or more azimuth regions, and displays one of the one or more picture files classified in each of the two or more azimuth regions on the screen. Thereafter, the picture file providing apparatus 200 receives a user input signal to select one of the displayed picture files, and displays a picture file list of one or more picture files that are classified based on the two or more azimuth regions to which the displayed picture files belong. When the picture file list is displayed on the screen, the picture file providing apparatus 200 receives a user input signal to select a picture file from the picture file list, enlarges the selected picture file, and displays the enlarged picture file on the screen.

In this regard, in order to display the direction information included in each picture file on the screen, the picture file providing apparatus 200 displays the one or more picture files by adding a mark, indicating the direction information on the one or more picture files, to each picture file, or by rotating the one or more picture files based on the direction information on each picture file.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

According to exemplary embodiments of the present invention, picture files that are classified according to a predetermined direction based on a specific location of a subject are provided, and thus a user can easily search for a picture that was captured at the specific location of the subject, or a picture that was captured near the specific location of the subject.

When the method and apparatus for providing picture files of exemplary embodiments of the present invention are used in a network environment, a great number of picture files are likely to be searched for based on location and direction information, so that the user can obtain more detailed information on a specific place and its surroundings through picture information.

While this invention has been particularly shown and described with reference to exemplary embodiments thereof, it will be understood by those of ordinary skill in the art that various changes in form and details may be made therein without departing from the spirit and scope of the invention as defined by the appended claims and their legal equivalents. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of providing a picture file, the method comprising:
    searching for one or more picture files based on a location of a subject, wherein each picture file comprises picture data, information on a location in which the picture data was created, and information on a direction of a captured image of a subject included in the picture data; and
    displaying the searched picture files on a screen according to the direction information included in each picture file,
    wherein the displaying the searched picture files comprises:
    dividing the region around the location of the subject into two or more azimuth regions based on the location of the subject;
    classifying the one or more picture files that were found based on the two or more azimuth regions; and
    displaying at least one of the one or more classified picture files for each of the azimuth regions on the screen.

2. The method of claim 1, further comprising selecting a search mode from among a first search mode and a second search mode for the searching for the one or more picture files, wherein:
    if the first search mode is selected, searching in the first search mode, wherein the searching in the first search mode comprises searching for only the one or more picture files among a plurality of picture files that have a direction facing towards the subject; and
    if the second search mode is selected, searching in the second search mode, wherein the searching in the second search mode comprises searching in all directions for the one or more picture files among a plurality of picture files.

3. The method of claim 2, wherein the first search mode or the second search mode is selected based on a user input signal.

4. The method of claim 1, further comprising:
    after displaying the one of the one or more classified picture files on the screen, if a user input signal for selecting one of the displayed picture files is received, displaying a picture file list of the one or more classified picture files located in a same azimuth region as a azimuth region to which the selected picture file belongs on the screen.

5. The method of claim 4, further comprising:
    when the picture file list is displayed on the screen, if a user input signal for selecting a picture file from the picture file list is received, enlarging the selected picture file and displaying the enlarged picture file on the screen.

6. The method of claim 1, further comprising at least one of:
    adding a mark which indicates the direction information on the searched picture files to each picture file, and
    rotating the searched picture files based on the direction information on each of the one or more picture files.

7. The method of claim 1, wherein, in the displaying of the searched picture files, the direction information included in each of the searched picture files is indicated in map data which indicates a region which includes the location of the subject.

8. An apparatus for proving a picture file, the apparatus comprising:
    a controller which searches for one or more picture files based on a location of a subject, wherein each picture file comprises picture data, information on a location in which the picture data is created, and information on a direction of a captured image of a subject included in the picture data; and
    a screen display unit which forms a display screen to display the searched picture files on the display screen according to the direction information included in each picture file,
    wherein the controller divides the region around the location of the subject into two or more azimuth regions based on the location of the subject, classifies the one or more picture files that were found based on the two or more azimuth regions, and controls the screen display unit to display at least one of the one or more classified picture files for each of the azimuth regions on the screen.

9. The apparatus of claim 8, wherein the controller selects a search mode from among a first search mode and a second search mode, wherein:
    if the first search mode is selected, the controller searches in the first search mode such that the controller searches for only the one or more picture files among a plurality of picture files that have a direction facing towards the subject; and
    if the second search mode is selected, the controller searches in the second search mode such that the controller searches in all directions for the one or more picture files among a plurality of picture files.

10. The apparatus of claim 9, further comprising a user input unit which receives a user input signal,
    wherein the first search mode or the second search mode is selected based on the user input signal.

11. The apparatus of claim 8, wherein, if the controller receives a user input signal for selecting one of the displayed picture files, the controller controls the screen display unit to display a picture file list of the one or more classified picture files located in a same azimuth region as a azimuth region to which the selected picture file belongs.

12. The apparatus of claim 11, wherein, when the picture file list is displayed on the screen, if the controller receives the user input signal for selecting a picture file from the picture file list, the controller enlarges the selected picture file and displays the enlarged picture file on the screen.

13. The apparatus of claim 8, wherein the controller controls the screen display unit to display the searched picture files by adding a mark which indicates the direction information on the searched picture files to each picture file, or by rotating the searched picture files based on the direction information on each picture file.

14. The apparatus of claim 8, wherein the screen display unit forms a display screen to indicate the direction information included in each of the searched picture files in map data which indicates a region which includes the location of the subject.

15. The apparatus of claim 14, wherein the picture files and the map data are received from a Web server over a communication network.

16. A non-transitory computer readable recording medium which stores a computer readable program for executing a picture file providing method, the method comprising:
  searching for one or more picture files based on a location of a subject, wherein each picture file comprises picture data, information on a location in which the picture data was created, and information on a direction of a captured image of a subject included in the picture data; and
  displaying the searched picture files on a screen according to the direction information included in each picture file,
  wherein the displaying the searched picture files comprises:
  dividing the region around the location of the subject into two or more azimuth regions based on the location of the subject;
  classifying the one or more picture files that were found based on the two or more azimuth regions; and
  displaying at least one of the one or more classified picture files for each of the azimuth regions on the screen.

\* \* \* \* \*